United States Defensive Publication [19] (H) [11] T102,301

Walker [43] Oct. 5, 1982

[54] USE OF POLYETHYLENE WAXES TO CONTROL METAL ORIENTATION IN PAINTS

[76] Inventor: Kenneth R. Walker, 11 Conway Dr., Billinge, Wigan, Lancs, England

[21] Appl. No.: 316,370

[22] Filed: Oct. 29, 1981

[51] Int. Cl.[3] ..... C08K 5/09

[52] U.S. Cl. ..... 524/556; 106/271; 106/272

[57] ABSTRACT

This invention relates to a method of preparing dispersions of low density polyethylene waxes which can be a chemically modified polyethylene wax or low molecular weight unmodified polyethylene wax and their use in metallic paints. The use of these dispersions prevents hard settling of the metal flake in the liquid paint which was measured to be better than the use of a dispersion made from an ethylene vinyl acetate wax dispersion (AC 405 wax). Also the use of such an Epolene wax dispersion allowed the paint to be sprayed rapidly while maintaining better appearance and smoothness than without any wax or an ethylene vinyl acetate wax dispersion.

1 Claim, No Sheets Drawing,

6 Pages Specification

The file of this unexamined application may be inspected and copies thereof may be purchased (849 O.G. 1221, Apr. 9, 1968).